United States Patent
Dharanipragada et al.

(10) Patent No.: US 7,016,839 B2
(45) Date of Patent: Mar. 21, 2006

(54) MVDR BASED FEATURE EXTRACTION FOR SPEECH RECOGNITION

(75) Inventors: Satayanarayana Dharanipragada, Ossining, NY (US); Bhaskar Dharanipragada Rao, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/062,816

(22) Filed: Jan. 31, 2002

(65) Prior Publication Data

US 2003/0144839 A1 Jul. 31, 2003

(51) Int. Cl.
*G10L 15/00* (2006.01)

(52) U.S. Cl. ..................... 704/245; 704/250
(58) Field of Classification Search ............... 704/245, 704/250
See application file for complete search history.

(56) References Cited

U.S. PATENT DOCUMENTS 4,866,777 A * 9/1989 Mulla et al. ................ 704/206
5,182,773 A * 1/1993 Bahl et al. .................. 704/222
6,161,089 A * 12/2000 Hardwick ................... 704/230

OTHER PUBLICATIONS

Bhaskar et al. "MVDR based all-pole modeling: . . . " dept. of electrical and computer engineering 1999 IEEE, pp 31-33.*

* cited by examiner

Primary Examiner—Daniel Abebe
(74) Attorney, Agent, or Firm—Frank V. DeRosa; F. Chau & Associates, LLC

(57) ABSTRACT

There is provided a method for extracting feature vectors from a digitized utterance. Spectral envelope estimates are computed from overlapping frames in the digitized utterance based on a Minimum Variance Distortionless Response (MVDR) method. Cepstral feature vectors are generated from the spectral envelope estimates. There is provided a method for generating spectral envelope estimates from a digitized utterance. The spectral envelope estimates are generated from overlapping frames in the digitized utterance based on a harmonic mean of at least two low- to-high resolution spectrum estimates. There is provided a method for reducing variance of a feature stream in a pattern recognition system. The feature stream is temporally or spatially averaged to reduce the variance of the feature stream.

15 Claims, 7 Drawing Sheets

MVDR BASED FEATURE EXTRACTION FOR SPEECH RECOGNITION

BACKGROUND OF THE INVENTION

1. Technical Field

The present invention relates generally to speech recognition and, in particular, Minimum Variance Distortionless Response (MVDR) based feature extraction for speech recognition.

2. Description of Related Art

Estimating the time-varying spectrum is a key first step in most feature extraction methods for speech recognition. Cepstral coefficients derived from a modified short-time spectrum is the most popular feature set and has been empirically observed to be the most effective for speech recognition. The modification of the spectrum is often based on perceptual considerations. Mel-Filtered Cepstral Coefficients (MFCC) is one such popular feature set.

Both parametric and non-parametric methods of spectrum estimation have been studied for speech modeling. Of the parametric methods, the Linear Predictive Coding (LPC) based all-pole spectrum is the most widely used. However, it has been noted in the speech modeling literature that for medium pitch voiced speech and high pitch voiced speech, LP based all-pole models do not provide good models of the spectral envelope. See, for example, El-Jaroudi et al., "Discrete All-Pole Modeling," IEEE Trans. Signal Processing, Vol. 39(2), pp. 411–23, February 1991. Furthermore, Linear Predictive (LP) based cepstra are known to be very sensitive to noise. In contrast, non-parametric spectrum estimation methods such as the Fast Fourier Transform (FFT) based Periodogram or Modified Periodogram are attractive since these methods are entirely data-independent and, thus, do not suffer from problems arising due to modeling deficiencies. However, these methods often are not robust and therefore perform poorly in noisy and adverse conditions. In general, parametric methods with accurate models suited for the given application should be able to provide more accurate and robust estimates of the short-term power spectrum.

Minimum Variance Distortionless Response (MVDR) spectrum-based modeling of speech was recently proposed by Murthi et al., in "All-pole Modeling of Speech Based on the Minimum Variance Distortionless Response Spectrum," IEEE Trans. on Speech and Audio Processing, pp. 221–39, May 2000. In the preceding article, it was shown that high order MVDR models provide elegant envelope representations of the short-term spectrum of voiced speech. This is particularly suited for speech recognition where model order is not a concern. Furthermore, it was shown that the MVDR spectrum is capable of modeling unvoiced speech, and mixed speech spectra. From a computational perspective, the MVDR modeling approach is also attractive because the MVDR spectrum can be simply obtained from a non-iterative computation involving the LP coefficients, and can be based upon conventional time-domain correlation estimates.

In speech recognition, in addition to faithful representation of the spectral envelope, statistical properties such as the bias and variance of the spectral estimate are also of great interest. Variance in the feature vectors has a direct bearing to the variance of the Gaussians modeling the speech classes. In general, reduction in feature vector variance increases class separability. Improved class separability can potentially increase recognition accuracy and decrease search speed.

Accordingly, it would be desirable and highly advantageous to have robust methods and apparatus for feature extraction for speech recognition that reduce feature vector variance.

SUMMARY OF THE INVENTION

The problems stated above, as well as other related problems of the prior art, are solved by the present invention, which is directed to Minimum Variance Distortionless Response (MVDR) based feature extraction for speech recognition. Feature extraction according to the present invention employs the Minimum Variance Distortionless Response (MVDR) method of spectrum estimation and a feature trajectory smoothing technique for reducing the variance in the feature vectors and therefore the Gaussians modeling the speech classes.

According to an aspect of the present invention, there is provided a method for extracting feature vectors from a digitized utterance. Spectral envelope estimates are computed from overlapping frames in the digitized utterance based on a Minimum Variance Distortionless Response (MVDR) method. Cepstral feature vectors are generated from the spectral envelope estimates.

According to another aspect of the present invention, there is provided a method for generating spectral envelope estimates from a digitized utterance. The spectral envelope estimates are generated from overlapping frames in the digitized utterance based on a harmonic mean of at least two low- to-high resolution spectrum estimates.

According to yet another aspect of the present invention, the spectral envelope estimates are MVDR spectral envelope estimates comprising a harmonic mean of Linear Predictive Coding (LPC) spectra of all model orders beginning from a first order.

According to still yet another aspect of the present invention, there is provided a method for reducing variance of a feature stream in a pattern recognition system. The feature stream is temporally or spatially averaged to reduce the variance of the feature stream.

According to a further aspect of the present invention, the pattern recognition system is a speech recognition system and the feature stream comprises cepstral vectors.

According to a yet further aspect of the present invention, there is provided a method for reducing variance in spectrum envelope estimates in a feature extraction step of speech recognition. The spectral envelope estimates are computed for each of at least two overlapping segments corresponding to a current overlapping frame in a digitized utterance. The computing step comprises the steps of averaging the spectral envelope estimates for the at least two overlapping segments to obtain a smoothed spectral envelope for the current overlapping frame, and computing a Mel-Filtered Cepstral Coefficients (MFCC) vector from the smoothed spectral envelope.

According to a still yet further aspect of the present invention, there is provided a method for reducing variance in a spectrum envelope estimate in a feature extraction step of speech recognition. The spectral envelope estimate is computed from each of at least two overlapping segments corresponding to a current overlapping frame of a digitized utterance. The computing step comprises the steps of computing a Mel-Filtered Cepstral Coefficients (MFCC) vector for each of the at least two segments corresponding to the current overlapping frame, from the spectral envelope estimate, and averaging together the MFCC vector for each of the at least two overlapping segments to obtain a smoothed MFCC vector for the current overlapping frame.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to Minimum Variance Distortionless Response (MVDR) based feature extraction for speech recognition. However, it is to be appreciated that the present invention may also be employed in other types of pattern recognition. That is, given the teachings of the present invention provided herein, one of ordinary skill in the related art will contemplate speech recognition as well as other types of pattern recognition to which the present invention may be readily applied, while maintaining the spirit and scope of the present invention.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform may also include an operating system and/or micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 1:
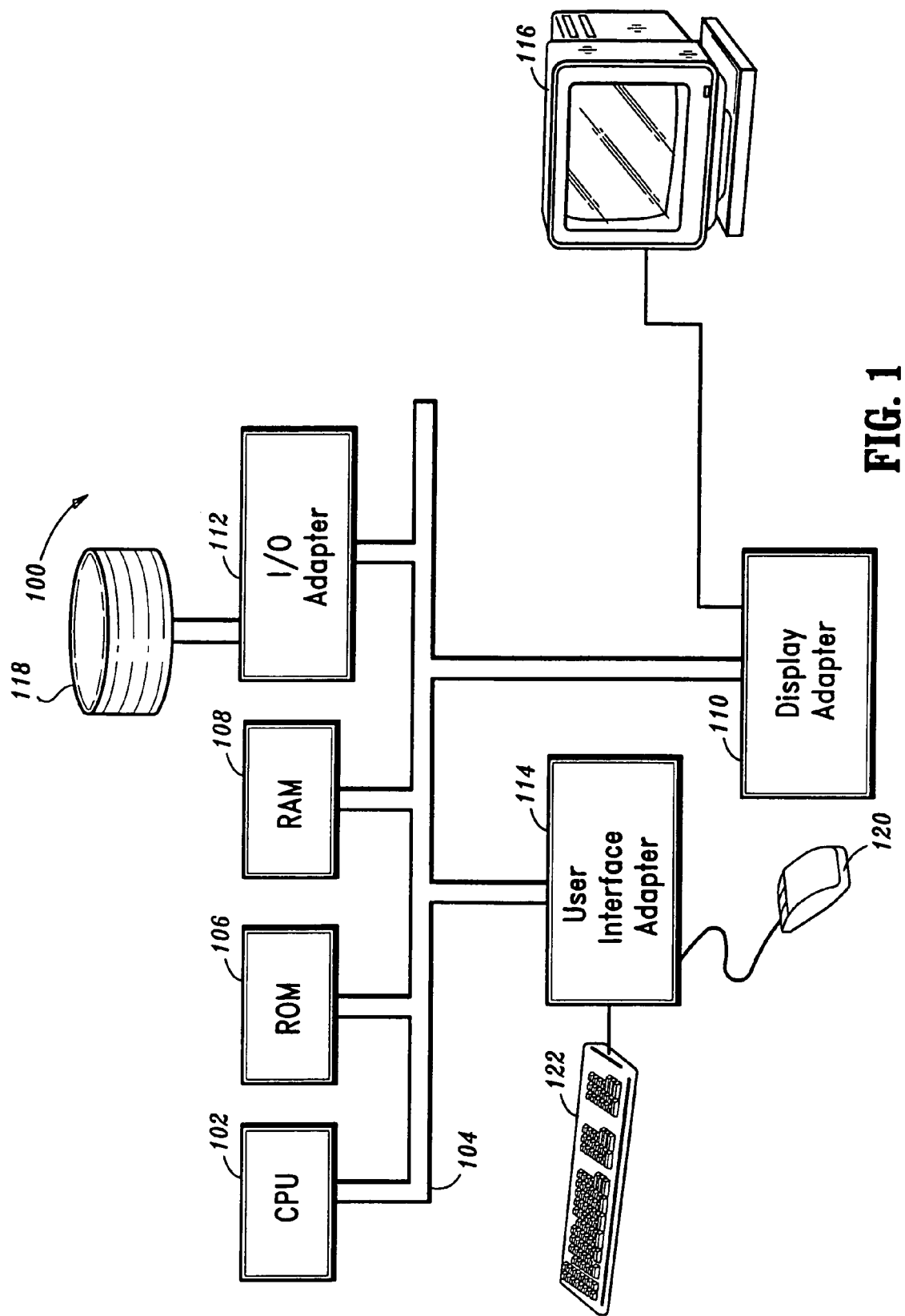
FIG. 1 is a block diagram of a computer processing system 100 to which the present invention may be applied according to an illustrative embodiment thereof.

FIG. 1 is a block diagram of a computer processing system 100 to which the present invention may be applied according to an illustrative embodiment thereof. The computer processing system includes at least one processor (CPU) 102 operatively coupled to other components via a system bus 104. A read-only memory (ROM) 106, a random access memory (RAM) 108, a display adapter 110, an I/O adapter 112, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100. It is to be appreciated that other configurations of computer processing system 100 may be employed in accordance with the present invention while maintaining the spirit and the scope thereof.

A description of the operations performed by an MVDR based frontend processor according to the invention will now be given according to an illustrative embodiment thereof. One or more of such processors may be employed as processor 102 shown in FIG. 1. The description of the MVDR based frontend processor will include descriptions of the following: bias and variance reduction; MVDR spectrum computation; mel-cepstra computation; and a second variance reduction step. Moreover, FIG. 2 below will illustrate elements composing such a processor, according to an illustrative embodiment of the present invention.

In non-parametric spectrum estimation methods like the FFT-based Periodogram method, power is measured using a single sample at the output of a bandpass filter centered at the frequency of interest, as described by: P. D. Welch, in "The use of Fast Fourier Transform for the Estimation of Power Spectra: A Method Based on Time Averaging over Short Modified Periodograms," IEEE Trans. Audio Electroacoust., vol. AU-15, pp. 70–76, June 1967; and Stoica et al., in "Spectral Analysis", Prentice-Hall, Englewood Cliffs, N.J., 1997. The nature of the bandpass filter is frequency and data independence, and is determined only by the nature and length of the window used. The window length is usually equal to the data segment length. For speech recognition, we are more interested in the statistical stability of the estimate than the spectral resolution limit. Two statistical properties of the spectrum estimate are of interest, i.e., bias and variance. A large bias or variance in estimates will ultimately lead to poor acoustic models. Bias is mainly caused by the leakage of power from surrounding frequencies through the side lobes or the main lobe of the bandpass filter. Since a single sample is used to estimate the power, Periodogram estimates have a large variance. Furthermore, since the bandpass filter is data independent, there is no flexibility to modify the side lobe properties to suppress dominant neighboring peaks. An approach to lower the variance is to use the Modified Periodogram or the Welch method. Such an approach leads to lower variance at the expense of larger bias. The larger bias is a consequence of the small window length resulting in a bandpass filter with larger bandwidth. Also, the bandpass filter employed is data independent. Both these shortcomings will be addressed by the MVDR and variance reduction methods described below.

A description of bias and variance reduction will now be given according to an illustrative embodiment of the present invention. In the MVDR spectrum estimation method, the signal power at a frequency $\omega_1$ is determined by filtering the signal by a specially designed Finite Impulse Response (FIR) filter h(n) and measuring the power at the output of the FIR filter h(n). The FIR filter h(n) is designed to minimize its output power subject to the constraint that its response at the frequency of interest, $\omega_1$, has unity gain, namely, $$H(e^{jw_l}) = \sum_{k=0}^{M} h(k)e^{-jw_l k} = 1 \tag{1}$$

This constraint, known as the distortionless constraint, can be written as $v^H(w_1)h=1$, where $h=[h_0, h_1, \ldots, h_m]^T$, $v(w)=[1, e^{jw}, e^{j2w}, \ldots, e^{jMw}]^T$. Mathematically, the distortionless filter h(n) is obtained by solving the following constrained optimization problem, $$\min_h h^H R_{M+1} h \text{ subject to } v^H(\omega_l)h = 1 \tag{2}$$

where $R_{M+1}$ is the $(M+1) \times (M+1)$ Toeplitz autocorrelation matrix of the data. The solution to this constrained optimization problem is as follows:

$$h_1 = \frac{R_{M+1}^{-1} v(\omega_l)}{v^H(\omega_l) R_{M+1}^{-1} v(\omega_l)} \tag{3}$$

The solution is described by: S. L. Marple Jr., in "Digital Spectral Analysis with Applications", Prentice-Hall, Englewood Cliffs, N.J., 1987; and S. Haykin, in "Adaptive Filter Theory", Prentice-Hall, Englewood Clifffs, N.J., 1991. The distortionless constraint ensures that the MVDR distortionless filter $h_1(n)$ will let the input signal components with frequency $w_1$ pass through undistorted, and the minimization of the output power ensures that the remaining frequency components in the signal are suppressed in an optimal manner. This synergistic constrained optimization is a key aspect of the MVDR method that allows it to provide a lower bias with a smaller filter length than the Periodogram method. Additionally, unlike the Periodogram method, the power is computed using all the output samples of the bandpass filter, which also provides a reduction in variance. Furthermore, smaller filter lengths for the same bias and variance enable usage of a second temporal averaging technique for further variance reduction in the feature vectors. These and other aspects, advantages, and features of the present invention are further described hereinbelow.

A description of MVDR spectrum computation will now be given according to an illustrative embodiment of the present invention. Fortunately, as in the Fast Fourier Transform (FFT) based methods, in the MVDR method there is no explicit need to design a separate filter $h_1(n)$ for each frequency $\omega_1$. In fact, the MVDR spectrum for all frequencies can be conveniently represented in a parametric form. It can be shown that the output power of the optimum constrained filter and, thus, the MVDR spectrum for all frequencies, can be simply computed as:

$$P_{MV}(\omega) = \frac{1}{v^H(\omega)R_{M+1}^{-1}v(\omega)} \tag{4}$$

This computation is described by S. Haykin, in "Adaptive Filter Theory", Prentice-Hall, Englewood Clifffs, N.J., 1991. Note that this represents the power obtained by averaging several samples at the output of the optimum constrained filter. This averaging results in reduced variance, as described by Stoica et al., in "Spectral Analysis", Prentice-Hall, Englewood Cliffs, N.J., 1997. For computational purposes, the Mth order MVDR spectrum can be parametrically written as:

$$P_{MV}(w) = \frac{1}{\sum_{k=-M}^{M} \mu(k)e^{-jwk}} = \frac{1}{|B(e^{jw})|^2} \tag{5}$$

The parameters $\mu(k)$ can be obtained from a modest non-iterative computation using the LP coefficients $a_k$ and prediction error variance $P_e$ as follows:

$$\mu(k) = \begin{cases} \frac{1}{P_e} \sum_{i=0}^{M-k} (M+1-k-2i)a_i a_{i+k}^*, & \text{for } k = 0, \ldots, M \\ \mu^*(-k)), & \text{for } k = -M, \ldots, -1 \end{cases} \tag{6}$$

This is also described by: S. L. Marple Jr., in "Digital Spectral Analysis with Applications", Prentice-Hall, Englewood Cliffs, N.J., 1987; and S. Haykin, in "Adaptive Filter Theory", Prentice-Hall, Englewood Clifffs, N.J., 1991. The (M+1) coefficients $\mu(k)$ completely determine the MVDR spectrum $P_{MV}(w)$. From Equation (5), the MVDR power spectrum can also be viewed as an all-pole model based power spectrum. The minimum-phase MVDR all-pole filter 1/B(z), if needed, can be obtained by a spectral factorization. The MVDR all-pole filter 1/B(z) is stable and casual, and can be used in a manner similar to the way in which LP filters are used in speech processing systems.

A description of mel-cepstra computation will now be given according to an illustrative embodiment of the present invention. There are two possible approaches to computing the cepstrum from the MVDR spectrum. The first approach is to compute the all-pole model and derive the cepstra directly from the coefficients of the all-pole filter B(z). The other approach is to compute the spectrum from the MVDR polynomial using the FFT and then compute the cepstral coefficients from the spectrum in the standard way. Herein, the second alternative is selected for explanation because of the ease with which perceptual considerations can be incorporated. However, it is to be appreciated that one of ordinary skill in the related art will readily understand and be able to implement the first approach given the teachings of the present invention provided herein, while maintaining the spirit and scope of the present invention.

A description of a second variance reduction step will now be given according to an illustrative embodiment of the present invention. The basic idea behind the second variance reduction step is smoothing. To understand this, consider the following example. Let $x_1, x_2, \ldots, x_p$ be P uncorrelated random variables with zero mean and variance $\sigma^2$. Consider $$y = \frac{1}{P} \sum_{i=1}^{P} x_i.$$

Clearly, y has zero mean and variance $$\frac{\sigma^2}{P}.$$

Thus, an estimate obtained by averaging P uncorrelated estimates provides a factor of P reduction in variance.

In the context of the speech recognition frontend, smoothing can be performed either to the power spectral samples or to the MFCC. In experiments described hereinbelow, the MFCC was chosen for smoothing. Averaging the MFCC is equivalent to taking a geometric mean of the spectral samples. To obtain several uncorrelated estimates of the MFCC, data segments that are uncorrelated with each other are required. For a WSS (Wide Sense Stationary) process with a sharply decaying correlation function, data segments that are sufficiently separated temporally will be uncorrelated. Thus, by splitting the data segment into several overlapping segments and computing power spectral estimates from each of the segments, power spectral estimates that are reasonably uncorrelated can be obtained. The MVDR estimation method facilitates this further because it requires shorter filter lengths for the same bias and variance. This effectively lets us create more uncorrelated data segments from a given frame of speech samples.

Therefore, instead of generating a single MFCC vector from a frame of speech, samples from the start of the current frame to the start of the next frame are split into several overlapping segments and an MFCC vector is computed from each segment. These vectors are then averaged to get the smoothed MFCC vector for that frame. This is equivalent to generating feature vectors at a high frame-rate and down sampling the resulting trajectories after low pass filtering in the time domain. The filtering operation is performed by simple averaging. This approach of filtering, motivated purely from statistical stability considerations, is very different from RASTA processing, which is motivated from human auditory perception considerations. Furthermore, the filtering here is done within each frame and not across frames like in RASTA. RASTA is further described by Hermansky et al., in "RASTA Processing of Speech," IEEE Trans. on Speech and Audio Processing, Vol. 2, No. 4, pp. 587–89, October 1994.

Figure 2:
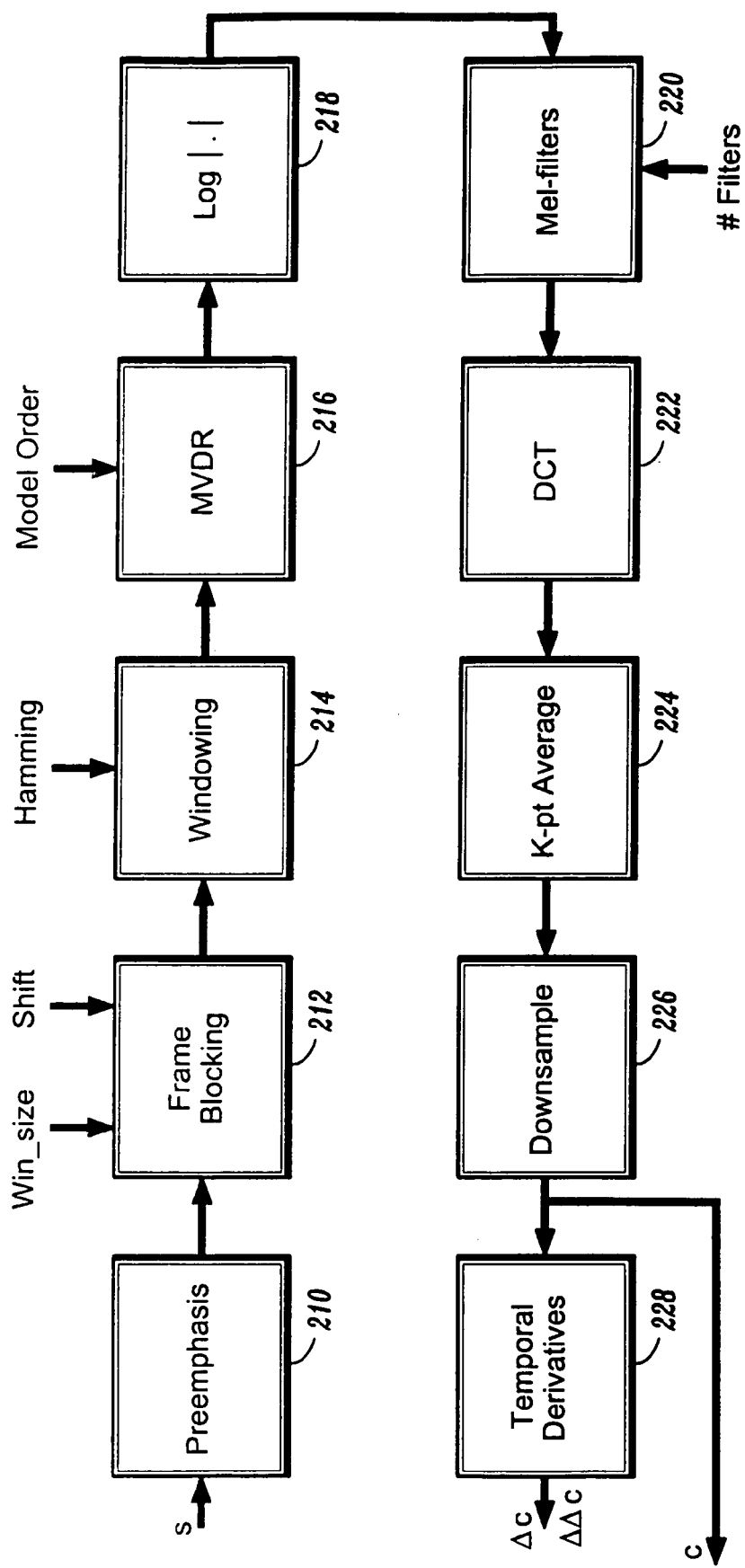
FIG. 2 is a block diagram illustrating a MVDR based front-end processor 200, according to an illustrative embodiment of the present invention.

FIG. 2 is a block diagram illustrating a MVDR based front-end processor 200, according to an illustrative embodiment of the present invention. The MVDR based front-end processor 200 includes: a pre-emphasis device 210; a frame blocking device 212; a windowing device 214; an MVDR device 216; a log device 218; mel-filters 220; a Discrete Cosine Transform (DCT) device 222; an averaging device 224; a down sampling device 226; and a temporal derivatives device 228. Given the nomenclature of the preceding elements and the teachings of the present invention provided herein, one of ordinary skill in the related art will readily identify which of the preceding elements perform the operations described below with respect to FIGS. 3 through 8, and thus they will not be further mentioned for reasons of brevity.

Moreover, for reasons of brevity, the present invention is hereinafter described with respect to FIGS. 3 through 8 as methods. However, as noted above, any of the methods and method steps described herein may also be implemented as hardware (e.g., apparatus and/or system) and/or a combination of hardware and software. Accordingly, given the teachings of the present invention provided herein, one of ordinary skill in the related art will contemplate these and various other implementations and arrangements of the present invention, all while maintaining the spirit and scope of the present invention.

It is to be appreciated that the illustrative examples of the present invention described below with respect to FIGS. 3 through 8 focus on concrete examples and thus identify certain items corresponding to feature extraction with specificity. For example, feature vectors of the cepstral type as well as many other items such as, for example, frame rate, are specifically mentioned and/or described. However, given the teachings of the present invention provided herein, one of ordinary skill in the related art will readily contemplate these and various other items which may be used in substitution with respect thereto (e.g., different types of vectors other than cepstral, different frame rate, and so forth) while in all cases maintaining the spirit and scope of the present invention.

Figure 3:
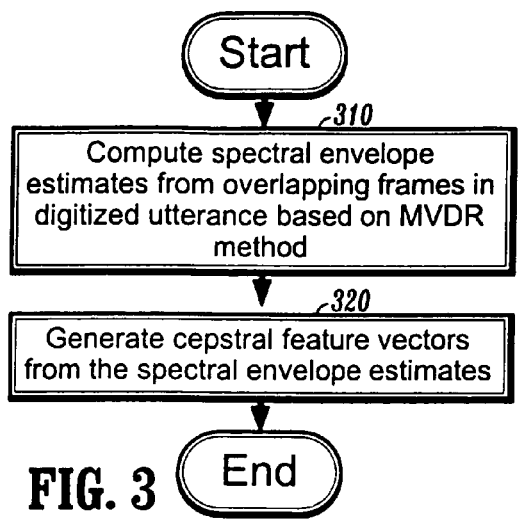
FIG. 3 is a flow diagram illustrating a method for extracting feature vectors from a digitized utterance, according to an illustrative embodiment of the present invention.

FIG. 3 is a flow diagram illustrating a method for extracting feature vectors from a digitized utterance, according to an illustrative embodiment of the present invention. Spectral envelope estimates are computed from overlapping frames in the digitized utterance based on a Minimum Variance Distortionless Response (MVDR) method (step 310). Cepstral feature vectors are generated from the spectral envelope estimates (step 320).

Figure 4:
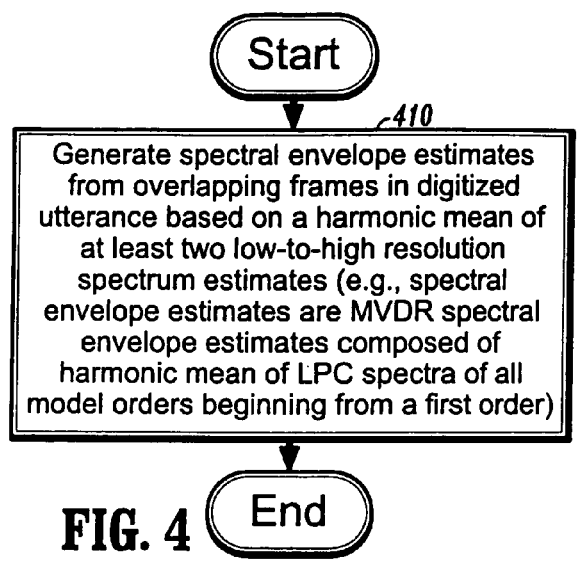
FIG. 4 is a flow diagram illustrating a method for generating spectral envelope estimates from a digitized utterance, according to an illustrative embodiment of the present invention.

FIG. 4 is a flow diagram illustrating a method for generating spectral envelope estimates from a digitized utterance, according to an illustrative embodiment of the present invention. Spectral envelope estimates are generated from overlapping frames in the digitized utterance based on a harmonic mean of at least two low-to-high resolution spectrum estimates (step 410). In one illustrative embodiment of the present invention, the spectral envelope estimates are Minimum Variance Distortionless Response (MVDR) spectral envelope estimates composed of the harmonic mean of LPC spectra of all model orders beginning from a first order.

One exemplary range for the low to high resolution spectrum estimates of step 410 is order-1 LPC spectral estimate to order-80 LPC spectral estimate. Another exemplary range for the low to high resolution spectrum estimates of step 410 is a highly tapered windowed periodogram for the low resolution spectrum estimates and an untapered or rectangular windowed periodogram for the high resolution spectrum estimates. It is to be appreciated that the preceding exemplary ranges are for illustrative purposes and, thus, other ranges may be employed while maintaining the spirit and scope of the present invention.

Figure 5:
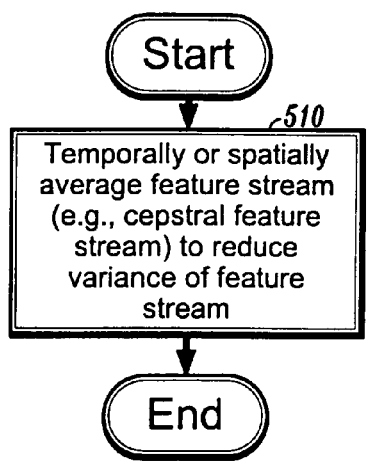
FIG. 5 is a flow diagram illustrating a method for reducing variance of a feature stream in a pattern recognition system, according to an illustrative embodiment of the present invention.

FIG. 5 is a flow diagram illustrating a method for reducing variance of a feature stream in a pattern recognition system, according to an illustrative embodiment of the present invention. The feature stream is temporally or spatially averaged to reduce the variance of the feature stream (step 510). In one illustrative embodiment of the present invention, the pattern recognition system is a speech recognition system and the feature stream comprises cepstral vectors.

Figure 6A:
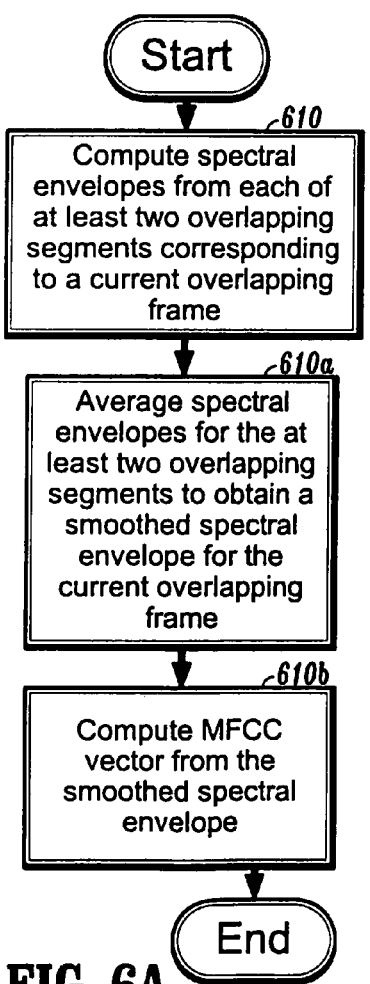
FIG. 6A is a flow diagram illustrating a method for extracting feature vectors with reduced variance from a digitized utterance, according to an illustrative embodiment of the present invention.

FIG. 6A is a flow diagram illustrating a method for extracting feature vectors with reduced variance from a digitized utterance, according to an illustrative embodiment of the present invention. The spectral envelope estimates are computed for each of at least two overlapping segments corresponding to a current overlapping frame in a digitized utterance (step 610). In one embodiment of the present invention, step 610 includes steps 610a and 610b. At step 610a, the spectral envelope estimates for the at least two overlapping segments are averaged to obtain a smoothed spectral envelope for the current overlapping frame. At step 610b, a Mel-Filtered Cepstral Coefficients (MFCC) vector is computed from the smoothed spectral envelope.

Figure 6B:
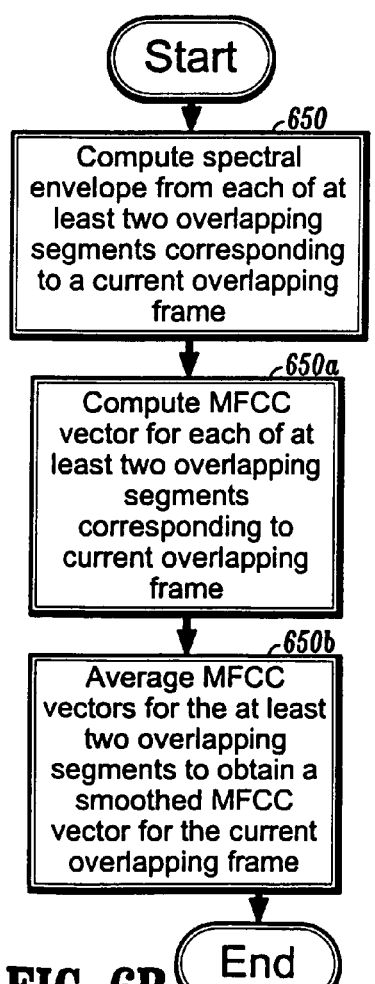
FIG. 6B is a flow diagram illustrating a method for extracting feature vectors with reduced variance from a digitized utterance, according to another illustrative embodiment of the present invention.

FIG. 6B is a flow diagram illustrating a method for extracting feature vectors with reduced variance from a digitized utterance, according to another illustrative embodiment of the present invention. The spectral envelope estimate is computed from each of at least two overlapping segments corresponding to a current overlapping frame of a digitized utterance (step 650). In one embodiment of the present invention, step 650 includes steps 650a and 650b. At step 650a, a Mel-Filtered Cepstral Coefficients (MFCC) vector is computed for each of the at least two segments corresponding to the current frame, from the spectral envelope estimate. At step 650b, the MFCC vectors for each of the at least two overlapping segments are averaged to obtain a smoothed MFCC vector for the current overlapping frame.

Figure 7A:
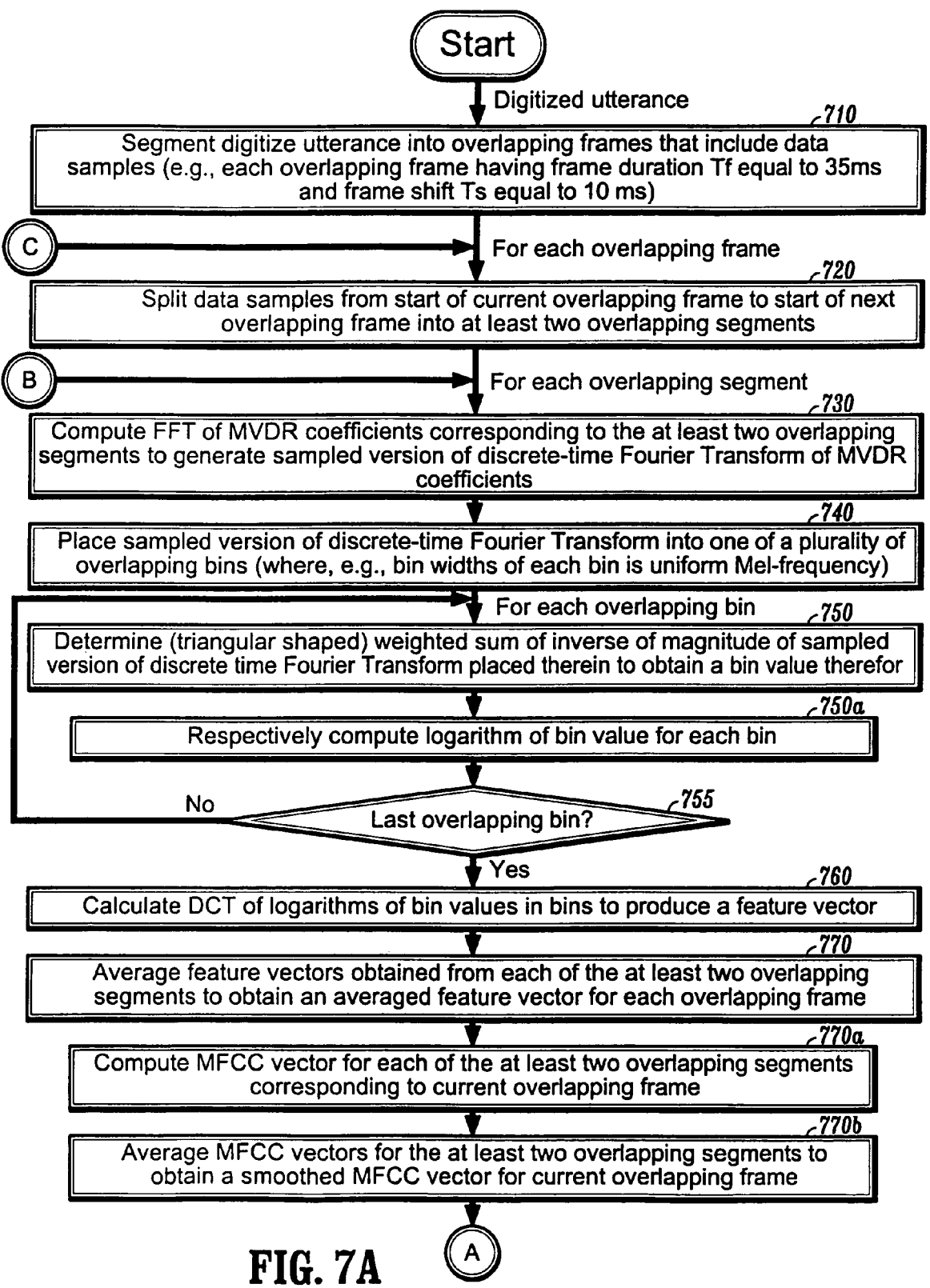
FIG. 7 is a flow diagram illustrating a method for extracting feature vectors from a digitized utterance, according to an illustrative embodiment of the present invention.
Figure 7B:
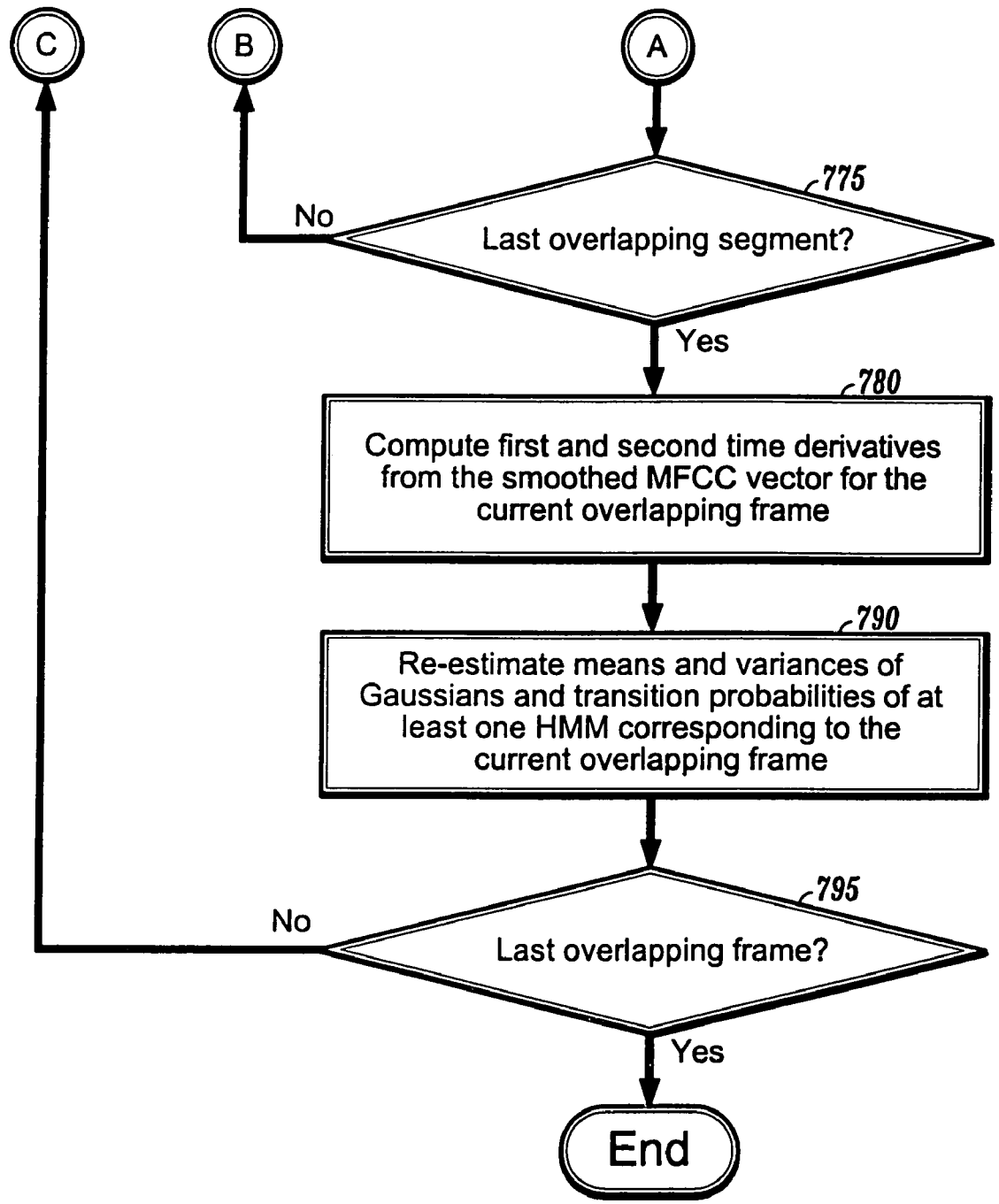

FIG. 7 is a flow diagram illustrating a method for extracting feature vectors from a digitized utterance, according to an illustrative embodiment of the present invention.

The digitized utterance is segmented into overlapping frames that include data samples (step 710). In one illustrative embodiment of the present invention, each of the overlapping frames has a frame duration Tf equal to 35 ms and a frame shift Ts equal to 10 ms. Of course, other values for Tf and Ts may be employed, while maintaining the spirit and scope of the present invention.

For each of the overlapping frames, steps 720 through 790 are performed. At step 720, the data samples from a start of a current overlapping frame to a start of a next overlapping frame are split into at least two overlapping segments.

For each of the at least two overlapping segments, steps 730 through 770 are performed At step 730, a Fast Fourier Transform (FFT) is computed of Minimum Variance Distortionless Response (MVDR) coefficients corresponding to the at least two overlapping segments to generate a sampled version of a discrete-time Fourier Transform of the MVDR coefficients. Step 730 is described in further detail in FIG. 8 below according to one illustrative embodiment of the present invention.

The sampled version of the discrete-time Fourier Transform is placed into one of a plurality of overlapping bins (step 740). In one illustrative embodiment of the present invention, bin widths of each of the plurality of overlapping bins are of a uniform Mel-frequency.

For each of the plurality of overlapping bins, step 750 is performed. At step 750, the weighted sum of the inverse of the magnitude of sampled versions of the discrete-time Fourier Transform placed therein is determined to obtain a bin value therefor. In one illustrative embodiment of the present invention, the weighted sum of the inverse of the magnitude of the sampled versions is triangular shaped. Step 750 includes the step of respectively computing a logarithm of the bin value for each of the plurality of bins (step 750a).

At step 755, it is determined whether there are any more overlapping bins. If so, then the method returns to step 750. Otherwise, the method proceeds to step 760.

A Discrete Cosine Transform (DCT) of the logarithms of the bin values in the plurality of bins is calculated to produce a feature vector (step 760).

At step 770, feature vectors obtained from each of the at least two segments are averaged to obtain an averaged feature vector for the current overlapping frame. In one illustrative embodiment of the present invention, step 770 further includes steps 770a and 770b. At step 770a, a Mel-Filtered Cepstral Coefficients (MFCC) vector is computed for each of the at least two overlapping segments corresponding to the current overlapping frame. At step 770b, MFCC vectors for the at least two overlapping segments are averaged to obtain a smoothed MFCC vector for the current overlapping frame.

At step 775, it is determined whether there are any more overlapping segments (from among the at least two overlapping segments). If so, then the method returns to step 730. Otherwise, the method proceeds to step 780.

Optionally, the method of FIG. 7 may further include steps 780 and 790. At step 780, first and second time derivatives are computed from the smoothed MFCC vector for the current overlapping frame. At step 790, means and variances of Gaussians and transition probabilities of at least one Hidden Markov Model (HMM) corresponding to the current overlapping frame are re-estimated (i.e., retrained in a conventional speech recognition system or, if the speech recognition system is built from scratch then the Gaussians are directly estimated). The re-estimated means and variances of Gaussians and transition probabilities of at least one Hidden Markov Model (HMM) may then be used in a training and/or decoding step of a speech recognition engine.

At step 795, it is determined whether there are any more overlapping frames (from among the at least two overlapping segments). If so, then the method returns to step 720. Otherwise, the method is terminated.

Figure 8:
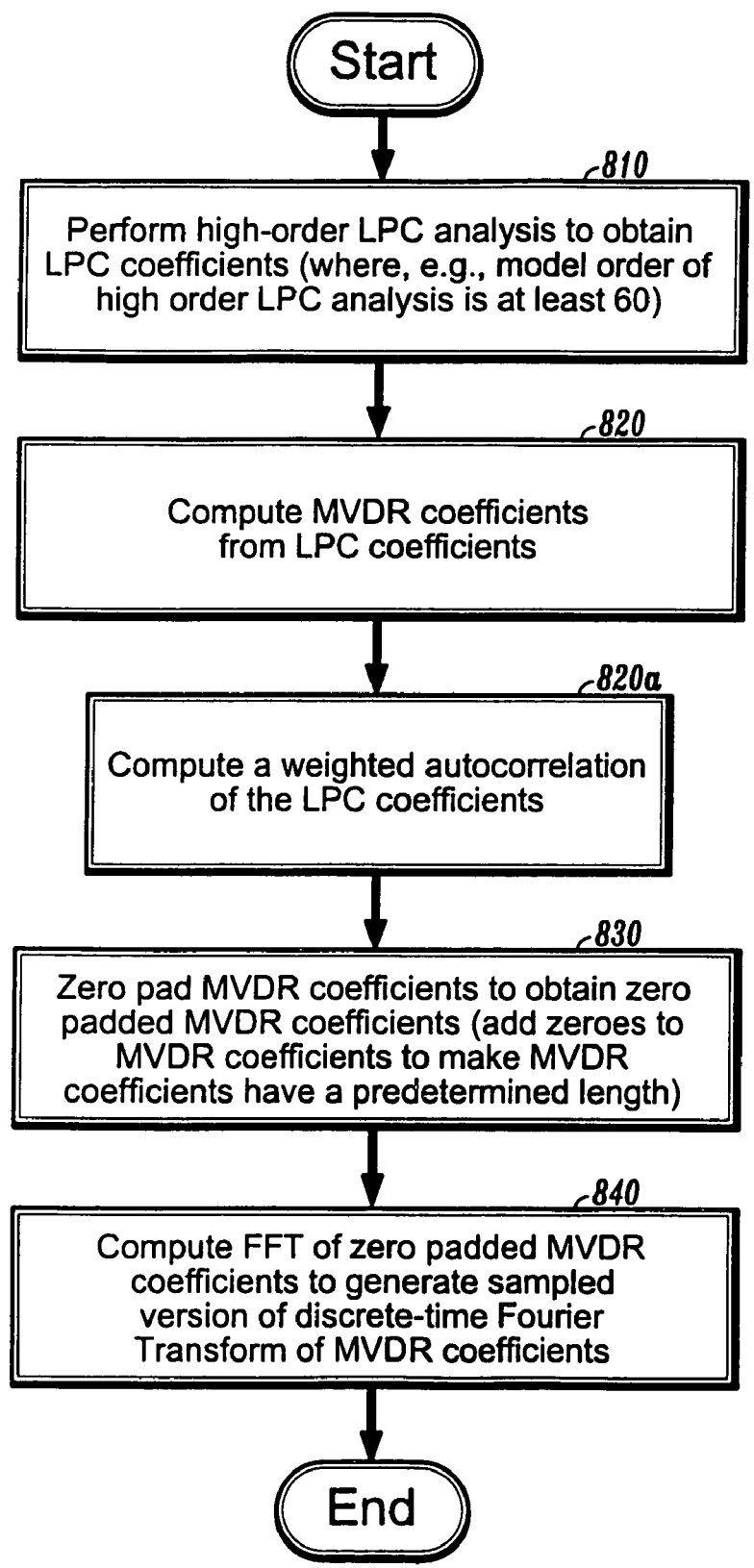
FIG. 8 is a flow diagram further illustrating step 730 of the method of FIG. 7, according to an illustrative embodiment of the present invention.

FIG. 8 is a flow diagram further illustrating step 730 of the method of FIG. 7, according to an illustrative embodiment of the present invention. A high order Linear Predictive Coding (LPC) analysis of the at least two overlapping segments is performed to obtain LPC coefficients therefore (step 810). In one illustrative embodiment of the present invention, a model order of the high order LPC analysis performed at step 810 is at least sixty.

The MVDR coefficients are computed from the LPC coefficients (step 820). In one illustrative embodiment of the present invention, step 820 may include the step of computing a weighted autocorrelation of the LPC coefficients (step 820a).

The MVDR coefficients are zero padded to obtain zero padded MVDR coefficients (step 830). The zero padding step includes the step of adding zeroes to the MVDR coefficients to make the MVDR coefficients have a predetermined length. The Fast Fourier Transform (FFT) of the zero padded MVDR coefficients is computed to generate the sampled version of the discrete-time Fourier Transform of the MVDR coefficients (step 840).

A description of some experimental results obtained by the present invention will now be given. The description will include a brief summary of the experiments, followed by a description of the system upon which the experiments were conducted, a description of the experimental setup and, finally, a description of the actual results obtained by the experiments.

Experiments were conducted with the feature extraction technique of the invention in a speech recognition system for a voice-activated car navigation system. The training data consists of a combination of cellular, speakerphone and car data collected using an appropriately placed microphone in a car. Car noise at various speeds was collected using a microphone over a cellular channel. Both clean speech and noise-added speech was used to train the systems.

A description of the system upon which the experiments were conducted will now be given. All experiments were conducted on the IBM rank-based LVCSR system. The IBM LVCSR system uses context-dependent sub-phone classes which are identified by growing a decision tree using the training data and specifying the terminal nodes of the tree as the relevant instances of these classes, as described by Bahl et al., in "Robust Methods for Context-Dependent Features and Models in a Continuous Speech Recognizer," Proc., Intl Conf. on Acoust., Speech, and Sig. Proc., 1994, pp. I-533–36. The training feature vectors are "poured down" this tree and the vectors that collect at each leaf are modeled by a mixture of Gaussian pdf's, with diagonal covariance matrices. Each leaf of the decision tree is modeled by a 1-state Hidden Markov Model with a self loop and a forward transition. Output distributions on the state transitions are expressed in terms of the rank of the leaf instead of in terms of the feature vector and the mixture of Gaussian pdf's modeling the training data at the leaf. The rank of a leaf is obtained by computing the log-likelihood of the acoustic vector using the model at each leaf, and then ranking the leaves on the basis of their log-likelihoods.

A description of the experimental setup will now be given. The baseline system was trained using standard FFT-based MFCC vectors. Speech was coded into 25 ms frames, with a frame-shift of 10 ms. Each frame was represented by a 39 component vector consisting of 13 MFCCs and their first and second time derivatives. Overall, the decision tree had 2615 leaves. Each leaf had 15 Gaussian mixture components for the output distribution.

Next, 13 dimensional MFCC features were generated at a high rate of 500 frames/s (frame-shift of 2 ms) using the MVDR spectrum estimate. A model order of 60 was chosen for the LPC analysis. Since we are dealing with car noise, the 24 triangular Mel-filters were chosen in the frequency range of 200 Hz to 3800 Hz. A smoothed MFCC stream was generated by taking a 5-point average and down sampling by a factor of 5 to produce a 100 frames/sec stream. First and second time derivatives are then computed from the smoothed MFCC stream. With this new feature stream, the means and the variances of the Gaussians and the transition probabilities of the HMM's were re-estimated using a Baum-Welch procedure.

Figure 9:
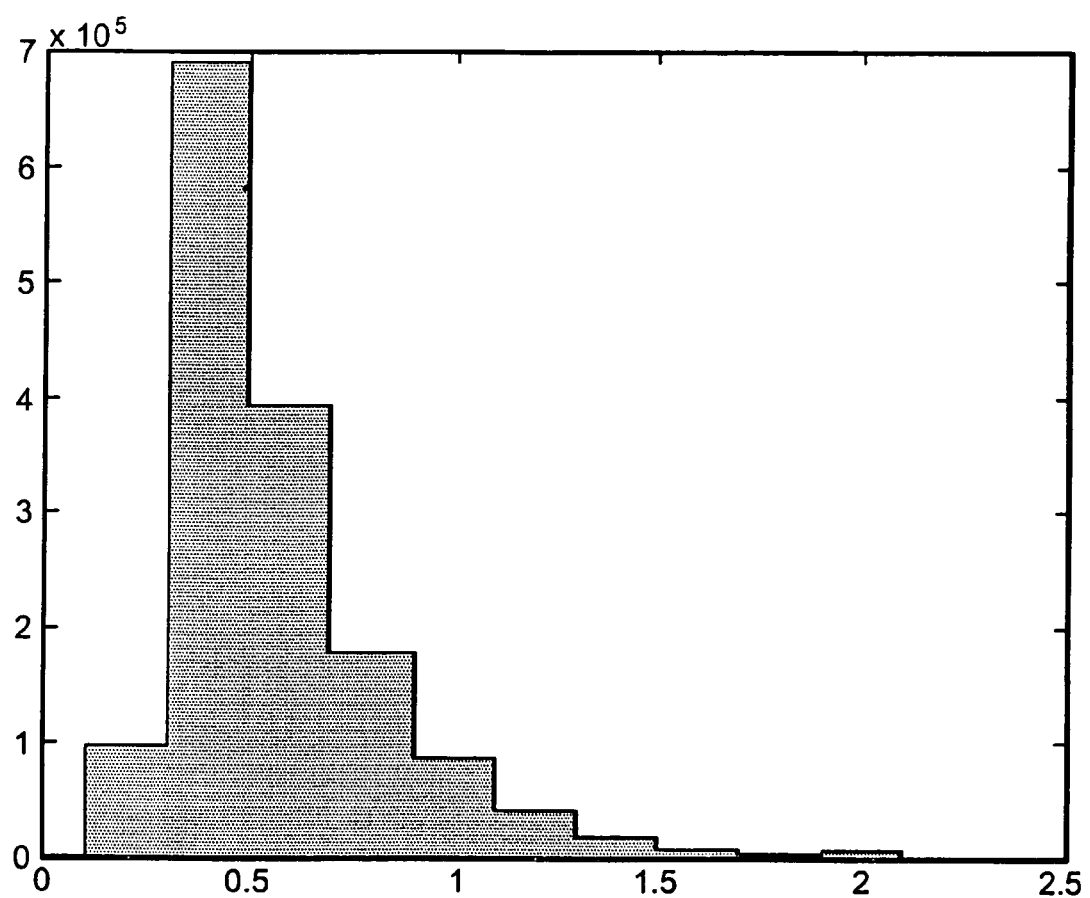
FIG. 9 is a diagram illustrating a histogram of the ratios of the variance of the Gaussians in the baseline (FFT-based) system and the variance of the Gaussians after retraining with the MVDR-based MFCC of the invention, according to an illustrative embodiment thereof.

A description of the actual results of the experiments will now be given. FIG. 9 is a diagram illustrating a histogram of the ratios of the variance of the Gaussians in the baseline (FFT-based) system and the variance of the Gaussians after retraining with the MVDR-based MFCC of the invention, according to an illustrative embodiment thereof. The large mass at 0.5 clearly indicates a strong reduction in the variances of the re-estimated Gaussians.

For the test set, several speakers were recorded in a stationary and moving car at 30 mph and 60 mph. Ten different sub-tasks within a navigation task, each with a different vocabulary size, were used to create a test set. Simple BNF (Backus-Naur Form) grammars were constructed for each task and were used to guide the search. Tables 1, 2, and 3 give a detailed comparison of the word error rates with the FFT-based MFCC system and the MVDR-based MFCC system according to the invention. In particular, Tables 1, 2, and 3 illustrate the Word-Error-Rate (WER) of the FFT-based baseline versus the MVDR-based MFCC system of the invention at 0 mph, 30 mph, and 60 mph, respectively. The results clearly indicate a significant improvement in the recognition accuracy in all the tasks and under all conditions. Average relative improvements of 27.9%, 32.3%, 38.5% were observed in the 0 mph, 30 mph, and the 60 mph conditions, respectively. As shown in the Tables, "VocSize" corresponds to the vocabulary size used, "#words" corresponds to the number of words spoken, "baseline" corresponds to the results obtained by a conventional speech recognition system, and "MVDR" corresponds to the results obtained by the present invention.

TABLE 1

| Task | VocSize | # words | Baseline | MVDR |
|---|---|---|---|---|
| airports | 335 | 750 | 12.13 | 7.33 |
| banks | 63 | 985 | 9.64 | 5.69 |
| commands | 22 | 439 | 11.85 | 13.44 |
| county | 1876 | 194 | 45.36 | 29.38 |
| gas-stations | 16 | 101 | 2.97 | 1.98 |
| hotels | 55 | 461 | 6.29 | 3.9 |
| reactions | 33 | 189 | 12.7 | 5.29 |
| service stations | 39 | 164 | 7.32 | 2.44 |
| U.S. cities | 12000 | 227 | 52.86 | 45.81 |

TABLE 2

| Task | VocSize | # words | Baseline | MVDR |
|---|---|---|---|---|
| airports | 335 | 672 | 8.48 | 6.1 |
| banks | 63 | 898 | 4.9 | 2.12 |
| commands | 22 | 346 | 14.74 | 9.83 |
| county | 1876 | 189 | 49.21 | 43.92 |
| gas-stations | 16 | 83 | 1.2 | 1.2 |
| hotels | 55 | 378 | 2.12 | 1.85 |
| reactions | 33 | 157 | 15.29 | 5.73 |
| service stations | 39 | 142 | 8.45 | 0 |
| U.S. cities | 12000 | 228 | 50.88 | 35.53 |

TABLE 3

| Task | VocSize | # words | Baseline | MVDR |
|---|---|---|---|---|
| airports | 335 | 378 | 16.93 | 7.14 |
| banks | 63 | 475 | 8.84 | 4.21 |

TABLE 3-continued

| Task | VocSize | # words | Baseline | MVDR |
|---|---|---|---|---|
| commands | 22 | 178 | 15.17 | 11.8 |
| county | 1876 | 86 | 62.79 | 46.51 |
| gas-stations | 16 | 47 | 14.89 | 2.13 |
| hotels | 55 | 218 | 9.63 | 7.34 |
| reactions | 33 | 87 | 17.24 | 6.9 |
| service stations | 39 | 76 | 7.89 | 7.89 |
| U.S. cities | 12000 | 111 | 70.27 | 50.45 |

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for extracting feature vectors with reduced variance from a digitized utterance, comprising the step of:
computing the spectral envelope estimates for each of at least two overlapping segments corresponding to a current overlapping frame in a digitized utterance,
wherein said computing step comprises the steps of:
averaging the spectral envelope estimates for the at least two overlapping segments to obtain a smoothed spectral envelope for the current overlapping frame; and
computing a Mel-Filtered Cepstral Coefficients (MFCC) vector from the smoothed spectral envelope.

2. The method of claim 1, wherein said method is implemented by a program storage device readable by machine, tangibly embodying a program of instructions executable by the machine to perform said method steps.

3. A method for extracting feature vectors from a digitized utterance, comprising the steps of:
segmenting the digitized utterance into overlapping frames that comprise data samples;
for each of the overlapping frames,
splitting the data samples from a start of a current overlapping frame to a start of a next overlapping frame into at least two overlapping segments;
for each of the at least two overlapping segments,
computing a Fast Fourier Transform (FFT) of Minimum Variance Distortionless Response (MVDR) coefficients corresponding to the at least two overlapping segments to generate a sampled version of a discrete-time Fourier Transform of the MVDR coefficients;
placing the sampled version of the discrete-time Fourier Transform into one of a plurality of overlapping bins;
for each of the plurality of overlapping bins,
determining a weighted sum of an inverse of a magnitude of sampled versions of the discrete-time Fourier Transform placed therein to obtain a bin value therefore;
calculating a Discrete Cosine Transform (DCT) of logarithms of bin values in the plurality of bins to produce a feature vector; and
averaging feature vectors obtained from each of the at least two segments to obtain an averaged feature vector for the current overlapping frame.

4. The method of claim 3, wherein each of the overlapping frames having a frame duration Tf equal to 10 ms and a frame shift Ts equal to 35 ms.

5. The method of claim 3, wherein bin widths of each of the plurality of overlapping bins are of a uniform Mel-frequency.

6. The method of claim 3, wherein said computing step comprises the steps of:
performing a high order Linear Predictive Coding (LPC) analysis of the at least two overlapping segments to obtain LPC coefficients therefore; and
computing the MVDR coefficients from the LPC coefficients.

7. The method of claim 6, wherein a model order of the high order LPC analysis is at least sixty.

8. The method of claim 6, wherein said step of computing the MVDR coefficients comprises the step of computing a weighted autocorrelation of the LPC coefficients.

9. The method of claim 3, wherein said step of computing the FFT of the MVDR coefficients comprises the steps of:
zero padding the MVDR coefficients to obtain zero padded MVDR coefficients; and
computing the Fast Fourier Transform (FFT) of the zero padded MVDR coefficients to generate the sampled version of the discrete-time Fourier Transform of the MVDR coefficients.

10. The method of claim 9, wherein said zero padding step comprises the step of adding zeroes to the MVDR coefficients to make the MVDR coefficients have a predetermined length.

11. The method of claim 3, wherein said calculating step comprises the step of respectively computing a logarithm of the bin value for each of the plurality of bins.

12. The method of claim 3, wherein the weighted sum of the inverse of the magnitude of the sampled versions is triangular shaped.

13. The method of claim 3, wherein said averaging step comprises the steps of:
computing a Mel-Filtered Cepstral Coefficients (MFCC) vector for each of the at least two overlapping segments corresponding to the current overlapping frame; and
averaging MFCC vectors for the at least two overlapping segments to obtain a smoothed MFCC vector for the current overlapping frame.

14. The method of claim 3, further comprising the steps of:
computing first and second time derivatives from the smoothed MFCC vector for the current overlapping frame; and
re-estimating means and variances of Gaussians and transition probabilities of at least one Hidden Markov Model (HMM) corresponding to the current overlapping frame.

15. The method of claim 3, wherein said method is implemented by a program storage device readable by machine, tangibly embodying a program of instructions executable by the machine to perform said method steps.

* * * * *